US012663583B2

(12) United States Patent
Messner et al.

(10) Patent No.: US 12,663,583 B2
(45) Date of Patent: Jun. 23, 2026

(54) PLASMONIC DEVICE ENABLING SIMPLIFIED FABRICATION

(71) Applicant: ETH ZURICH, Zürich (CH)

(72) Inventors: Andreas Christian Messner, Zürich (CH); Joel Simon Winiger, Zürich (CH); Ping Ma, Rüschlikon (CH); Pascal Armin Jud, Dübendorf (CH); Christian Haffner, Gaithersburg, MD (US); Juerg Leuthold, Neerach (CH)

(73) Assignee: ETH ZURICH, Zurich (CH)

( * ) Notice: Subject to any disclaimer, the term of this patent is extended or adjusted under 35 U.S.C. 154(b) by 180 days.

(21) Appl. No.: 17/765,067

(22) PCT Filed: May 19, 2020

(86) PCT No.: PCT/EP2020/064006
§ 371 (c)(1),
(2) Date: Mar. 30, 2022

(87) PCT Pub. No.: WO2021/063548
PCT Pub. Date: Apr. 8, 2021

(65) Prior Publication Data
US 2022/0326438 A1 Oct. 13, 2022

(30) Foreign Application Priority Data
Sep. 30, 2019 (CH) ...................................... 1242/19

(51) Int. Cl.
*G02B 6/122* (2006.01)
*G02F 1/21* (2006.01)
*G02F 1/225* (2006.01)

(52) U.S. Cl.
CPC ........... *G02B 6/1226* (2013.01); *G02F 1/212* (2021.01); *G02F 1/225* (2013.01); *G02F 2203/10* (2013.01)

(58) Field of Classification Search
CPC .. G02B 5/008; G02B 6/12004; G02B 6/1226; G02B 6/124; G02F 1/212; G02F 1/225; G02F 2203/10; G02F 1/313; G02F 1/353
See application file for complete search history.

(56) References Cited

U.S. PATENT DOCUMENTS 6,967,347 B2 * 11/2005 Estes .................... G02B 6/4201
257/30
7,027,689 B2 * 4/2006 Blumberg ................ G02B 6/34
385/39

(Continued)

FOREIGN PATENT DOCUMENTS

EP 1445632 A1 8/2004
WO WO-2013112201 A1 * 8/2013 ............. B82Y 20/00
WO WO-2016154764 A2 * 10/2016 ........... G02F 1/0027

OTHER PUBLICATIONS

Matthew J. Dicken, Luke A. Sweatlock, Domenico Pacifici, Henri J. Lezec, Kaushik Bhattacharya, and Harry A. Atwater. Electrooptic Modulation in Thin Film Barium Titanate Plasmonic Interferometers. Nano Letters 2008 8 (11), 4048-4052. DOI: 10.1021/nl802981q (Year: 2008).*

(Continued)

*Primary Examiner* — Daniel Petkovsek
(74) *Attorney, Agent, or Firm* — Quantum Patent Law Firm; Seongyoune Kang

(57) ABSTRACT

Disclosed is a plasmonic device (10), comprising: a substrate (11); and a dielectric layer (13) arranged between a base metal layer (12) and a structured metal layer (14) which form with respect to the substrate (11) a vertical stack of layers, wherein the structured metal layer (14) includes arranged in a horizontal direction an input structure (141) for enabling an input section (21), a waveguide structure (142) for enabling a plasmonic waveguide (22), and an output structure (143) for enabling an output section (23), wherein (Continued)

the input section (21) is configured to receive an optical input signal (31) and transmit input power (41) to the plasmonic waveguide (22), wherein the plasmonic waveguide (22) is configured to receive input power (41) from the input section (21) and transmit output power (43) to the output section (23), and wherein the output section (23) is configured to receive output power (43) from the plasmonic waveguide (22) and transmit an optical output signal (33).

20 Claims, 10 Drawing Sheets

(56)                References Cited

U.S. PATENT DOCUMENTS

| | | | | |
|---|---|---|---|---|
| 7,773,228 | B1 * | 8/2010 | Hollingsworth | A61B 5/291 |
| | | | | 359/585 |
| 8,755,648 | B1 * | 6/2014 | Sayyah | G02F 1/2257 |
| | | | | 385/30 |
| 9,583,650 | B1 * | 2/2017 | Yu | G02B 5/008 |
| 9,983,354 | B1 | 5/2018 | Ptasinski et al. | |
| 2003/0206708 | A1 * | 11/2003 | Estes | G02B 6/1226 |
| | | | | 385/37 |
| 2004/0234223 | A1 * | 11/2004 | Logvin | G02B 6/126 |
| | | | | 385/129 |
| 2009/0273820 | A1 | 11/2009 | Dionne et al. | |
| 2010/0002979 | A1 * | 1/2010 | Diest | G02F 1/133516 |
| | | | | 385/129 |
| 2011/0109956 | A1 * | 5/2011 | Hashimura | G02F 1/23 |
| | | | | 359/290 |
| 2012/0057215 | A1 * | 3/2012 | Suh | G02F 1/00 |
| | | | | 359/240 |
| 2012/0281957 | A1 * | 11/2012 | Chamanzar | G02B 6/12007 |
| | | | | 977/773 |
| 2013/0155484 | A1 * | 6/2013 | Sweatlock | G02F 1/23 |
| | | | | 359/282 |
| 2016/0161671 | A1 * | 6/2016 | Park | G02B 6/122 |
| | | | | 385/14 |
| 2016/0170242 | A1 * | 6/2016 | Whelan-Curtin | G02F 1/025 |
| | | | | 438/31 |
| 2018/0013031 | A1 * | 1/2018 | Sachet | G01J 1/044 |
| 2018/0246391 | A1 * | 8/2018 | Sun | H04Q 11/0005 |
| 2018/0267339 | A1 * | 9/2018 | Liu | G02F 1/017 |

OTHER PUBLICATIONS

Thomas Sondergaard et al., Extraordinary Optical Transmission Enhanced by Nanofocusing, Nano Letters, vol. 10, No. 8, 2010 (Year: 2010).*

Fanghui Ren et al., Surface-normal plasmonic modulator using sub-wavelength metal grating on electro-optic polymer thin film, Optics Communications 352(2015) 116-120 (Year: 2015).*

Ayata et al., High-speed plasmonic modulator in a single metal layer, Research Report Optoelectronics, Science 338, 630-632 (2017) (Year: 2017).*

Mike Pramassing et al., Interferometric near-field characterization of plasmonic slot waveguides in single- and poly-crystalline gold films, arXiv: 1907.06695, submitted on Jul. 15, 2019 (Year: 2019).*

Bosshard, C. et al. (1999). Organic Materials for Second-Order Nonlinear Optics. In: Braga, D., Grepioni, F., Orpen, A.G. (eds) Crystal Engineering: From Molecules and Crystals to Materials. NATO Science Series, vol. 538. Springer, Dordrecht. https://doi.org/10.1007/978-94-011-4505-3_15 (Year: 1999).*

Heni, W. et al. "Nonlinearities of organic electro-optic materials in nanoscale slots and implications for the optimum modulator design," Opt. Express 25, 2627-2653 (2017). (Year: 2017).*

Z. Han et al., "Surface Plasmon Bragg Gratings Formed in Metal-Insulator-Metal Waveguides", IEEE Photonics Technol. Lett., 19(2), 91-93 (2007) doi: 10.1109/LPT.2006.889036, 3 pages. (Year: 2007).*

Michael G. Nielsen et al, "Highly confined gap surface plasmon modes in metal strip-gap-film configurations", Journal of Optical Society of America, pp. 462-467, vol. 32, No. 3, Feb. 24, 2015.

Hoekstra H J W M et al, "A COST 240 Benchmark Test for Beam Propagation Methods Applied to an Electrooptical Modulator Based on Surface Plasmons", Journal of Lightwave Technology, IEEE, USA, vol. 16, No. 10, Oct. 1, 1998.

Hamidreza Chalabi et al, "Hot-Electron Photodetection with a Plasmonic Nanostripe Antenna", NANO Letters, vol. 14, No. 3, Feb. 17, 2014. Abstract only.

* cited by examiner

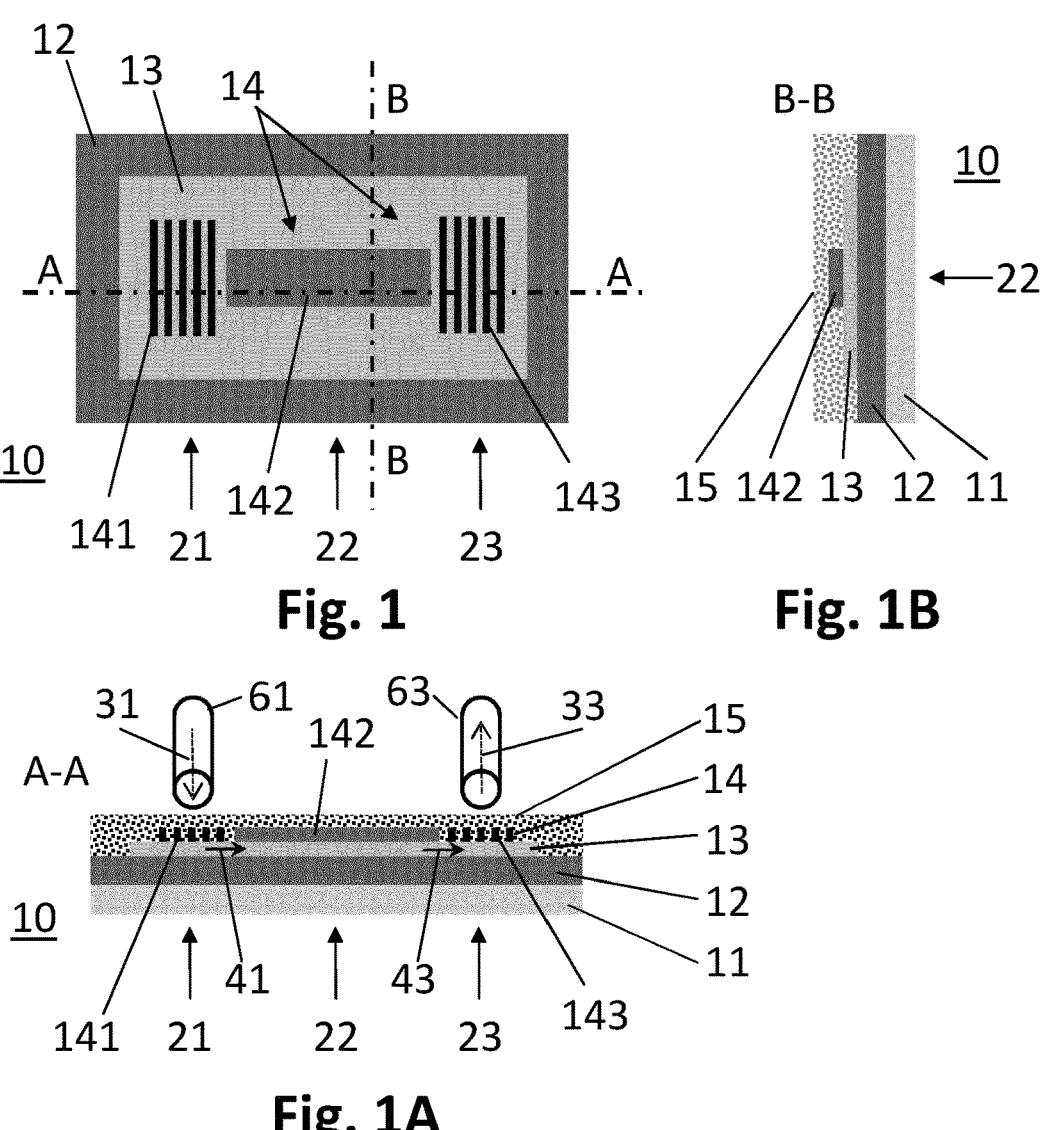
Fig. 1
Fig. 1B
Fig. 1A
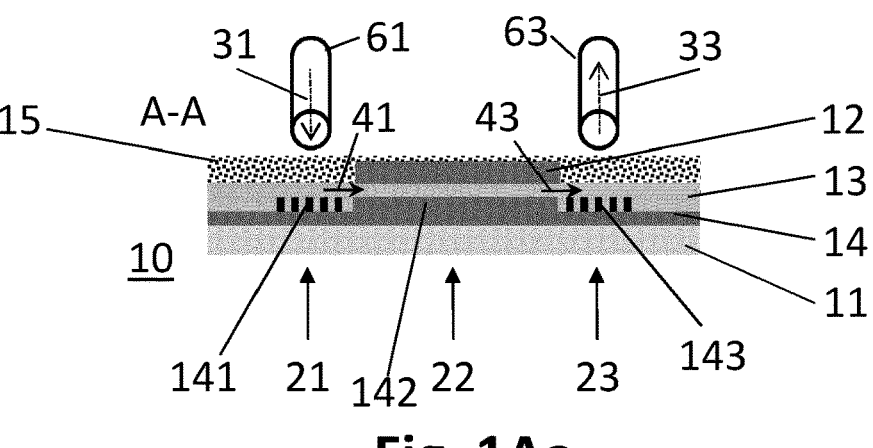
Fig. 1Aa

B-B

B-B

S1a — transmitting an optical input signal

S2a — applying an electrical signal

S3a — receiving an optical output signal

S1b — transmitting an optical input signal

S2b — detecting an electrical signal

S1c — transmitting an optical input signal

S2c — receiving an optical output signal

PLASMONIC DEVICE ENABLING SIMPLIFIED FABRICATION

CROSS-REFERENCE TO RELATED APPLICATIONS

This application is a U.S. national stage application of International Application No. PCT/EP2020/064006, filed May 19, 2020 and the entire contents of which are incorporated herein by reference, which claims priority to Swiss Patent Application No. CH 01242/19, filed on Sep. 30, 2019 and the entire contents of which are incorporated herein by reference.

FIELD OF THE INVENTION

The present disclosure relates to a plasmonic device. In particular, the present disclosure relates to a plasmonic device for providing a plasmonic modulator, a plasmonic detector or a plasmonic modifier.

BACKGROUND ART

Electro-optic modulators are devices which enable conversion of an electrical signal into an optical signal, or in other words, which enable modulation of an optical signal in accordance with an electrical signal. Electro-optic modulators are key components in optical communications, sensing, and signal processing systems. Important requirements for these devices are high speed, low optical loss, high modulation depth, compact footprint, low energy consumption and enablement of high density integrated circuit solutions.

However, electro-optic modulators are presently often discrete elements which do not have a compact footprint. Even on-chip integrated devices have a large footprint, which is a consequence of the diffraction limit of light. Furthermore, the large size eventually limits high-speed capabilities.

Plasmonic devices offer a solution to build electro-optical devices which simultaneously meet above requirements. Plasmonic devices introduce materials with a negative permittivity, e.g. metals, to overcome the diffraction limit, to localize and guide light, and to offer intrinsic high-speed behavior.

A plasmonic electro-optic modulator, or in short words a plasmonic modulator, may be built in accordance with WO2016154764.

WO2016154764 discloses an electro-optic element comprising a plasmonic waveguide. Parallel to a substrate, an epitaxially grown ferroelectric material is arranged between two electrically conductive electrodes, forming the plasmonic waveguide. The plasmonic waveguide guides surface plasmon polariton modes, which are modulated by a voltage applied to the electrodes. Very narrow widths of the ferroelectric material can be provided enabling strong electric fields which result in significant electro-optic effects. The width of the ferroelectric material can be much smaller than $\lambda/2n$, where $\lambda$ is the device operating wavelength and n is the refractive index of the ferroelectric material. For example, for an operating wavelength of $\lambda=1550$ nm and a refractive index of n=2.3, the width of the ferroelectric material can be much smaller than 337 nm.

Matthew J. Dicken et al., Electrooptic Modulation in Thin Film Barium Titanate Plasmonic Interferometers, NANO LETTERS 2008 Vol. 8, No. 11 4048-4052, American Chemical Society, discloses a plasmonic modulator based on interference of surface plasmon polaritons (SPPs) launched from a set of parallel slits milled into a planar metal film. The counterpropagating SPPs travel with wavevector kSPP along the Ag/BaTiO3 interface. The interference of these SPPs with the transmitted fields can be affected by an applied voltage across the BaTiO3 layer, by means of electrooptic modulation and electrically induced domain switching. The BaTiO3 layer is arranged between the metal layer and a transparent SrRuO layer, which is arranged on a transparent MgO layer.

Fanghui Ren et al., Surface-normal plasmonic modulator using sub-wavelength metal grating on electro-optic polymer thin film, Optics Communications 352(2015) 116-120, Elsevier, discloses a gold (Au)/electro-optic polymer/indium-tin oxide (ITO) sandwich structure arranged on a glass substrate. The device was mounted on a five axis stage, which allowed precise adjustment of the position and incident angle. Light was transmitted through the chip perpendicular to the chip plane. The transmitted beam after the sample was focused by an objective lens and coupled into an optical spectrum analyzer.

Mike Pramassing et al., Interferometric near-field characterization of plasmonic slot waveguides in single- and poly-crystalline gold films, arXiv:1907.06695, submitted on 15 Jul. 2019, discusses light propagation in plasmonic gold/air/gold slot waveguides, which are arranged horizontally one beside the other on a SiO2 substrate. The plasmonic propagation length is found to be maximal for slot widths around ~100 nm and to decrease for larger slot widths, which is attributed to leakage radiation into the SiO2 substrate. This leakage could be suppressed by embedding the gold film in a symmetric dielectric environment, e.g. by coating the gold film with a spin-on-dielectric.

Thomas Søndergaard et al., Extraordinary Optical Transmission Enhanced by Nanofocusing, Nano Letters, vol. 10, no. 8, 2010, discloses that light transmission through one-dimensional arrays of tapered slits in gold films suspended in air and being illuminated with normally incident p-polarized light is maximal for taper angles between 7° and 10°, and in particular higher than transmission through slits with perfectly vertical sidewalls.

Ayata et al., High-speed plasmonic modulator in a single metal layer, Research Report Optoelectronics, Science 338, 630-632 (2017), discloses an all-plasmonic 116 gigabits per second electro-optical modulator in which all the elements (the vertical grating couplers, the splitters, polarization rotators, and active section with phase shifters) are included in a single metal layer.

DISCLOSURE OF THE INVENTION

There may be a need for an improved plasmonic device avoiding some drawbacks of the prior art. More particularly, there may be a need for an improved plasmonic device which can be fabricated more easily. Furthermore, there may be a need for an improved plasmonic device which can be deployed in connection with various technologies, in particular on various substrate types and/or on various materials.

Such a need may be met with the subject-matter of the independent claims. Advantageous embodiments are defined in the dependent claims.

Ideas underlying embodiments of the present invention may be interpreted as being based, inter alia, on the following observations and recognitions.

An aspect of the invention relates to a plasmonic device comprising a substrate, and a dielectric layer arranged between a base metal layer and a structured metal layer which form with respect to the substrate a vertical stack of layers, wherein the structured metal layer includes arranged in a horizontal direction an input structure for enabling an input section, a waveguide structure for enabling a plasmonic waveguide, and an output structure for enabling an output section, wherein the input section is configured to receive an optical input signal and transmit input power to the plasmonic waveguide, wherein the plasmonic waveguide is configured to receive input power from the input section and transmit output power to the output section, and wherein the output section is configured to receive output power from the plasmonic waveguide and transmit an optical output signal. Previously, a plasmonic device was fabricated by depositing a metal layer on a substrate and forming a device pattern using lithography, thereby providing a horizontal structure, wherein the plasmonic waveguide included a horizontal gap of for example 100 nanometer having the metal plate on each side. Accordingly, highly precise lithography was required. The plasmonic device according to the invention requires depositing a vertical structure including a dielectric layer of for example 100 nanometer thickness, which can be fabricated precisely with known fabrication processes. Highly precise lithography is not required. Accordingly, fabrication is simplified and the plasmonic device according to the invention can be fabricated more easily.

In some embodiments, the area of the base metal plate is at least twice as large as the area of the waveguide structure. With respect to the waveguide structure, the metal plate essentially has infinite dimensions, thereby providing a plasmonic waveguide having high efficiency, in particular avoiding unwanted edge effects and/or providing a highly homogeneous field distribution.

In some embodiments, the waveguide structure has a rectangular form, a circular form or an oval form, or a combination thereof, when viewed from the top. A wide variety of configurations is enabled.

In some embodiments, the waveguide structure includes periodically arranged notchings. The notchings may be chosen in accordance to particular properties of the optical signals, for example, and desired improvements to be achieved, such as improved modulation efficiency, light intensity modulation, wavelength filtering, etc.

In some embodiments, the waveguide structure includes a plurality of laterally separated individual waveguide structures providing a plurality of individual plasmonic waveguides. Power transmitted by the input section is equally distributed into the plurality of waveguides, and collected for transmission to the output section, enabling use of interference effects.

In some embodiments, the structured metal layer further includes a resonant element, which is preferably arranged in proximity to the waveguide structure. For example, reduced transmission or enhanced reflection is enabled, or improved modulation efficiency, light intensity modulation, wavelength filtering, etc. is enabled.

In some embodiments, the input structure and/or the output structure include a grating structure. For example, efficiency of the input section and/or the output section is enhanced, and/or the optical bandwidth is enlarged. In particular, these metal grating couplers may be optically broad band in comparison with dielectric couplers. In some embodiments, metal grating couplers may have a bandwidth of larger than 100 nanometer and silicon grating couplers may have a bandwidth of about 30 nanometer.

In some embodiments, the base metal layer is deposited on the substrate. The plasmonic device can be deployed in connection with various technologies.

In some embodiments, the structured metal layer is deposited on the substrate. The base metal layer is configured to enable the input section for receiving the optical input signal and to enable the output section for transmitting the optical output signal. For example, the geometry of the base metal layer is chosen in accordance with the location of the input and output structures of the structured metal layer. In some embodiments, the length of the base metal layer corresponds to or equals the distance between (inner portions) of the input and output structures of the structured metal layer.

In some embodiments, the plasmonic device further comprises an optical waveguide layer for transmitting optical signals in an essentially horizontal direction, wherein the waveguide layer is optically connected to the structured metal layer. In particular, the waveguide layer is optically connected to the input structure and/or to the output structure of the structured metal layer. In particular, transmission of an optical signal from the waveguide layer to the input section is enabled, and/or transmission of an optical signal from the output section to the waveguide layer is enabled. For example, the waveguide layer is deposited on the substrate and the structured metal layer is deposited on the waveguide layer. For example, further layers, such as a dielectric layer, may be deposited between the waveguide layer and the structured metal layer. The plasmonic device can be deployed in connection with existing photonic technologies, such as SiN or LiNbO3 technologies.

In some embodiments, the plasmonic device further comprises one or more additional layers deposited on the substrate, the base metal layer, the dielectric layer and/or the structured metal layer, in particular one or more additional metal layers and/or one or more insulating layers.

In some embodiments, the plasmonic device further comprises a superstrate/cladding.

In some embodiments, the plasmonic device further comprises electrical pads for connecting an electrical signal generator and/or an electrical signal detector to the base metal layer and the waveguide structure.

In some embodiments, the dielectric layer is selected from a material which provides one or more of a second order nonlinearity and a third order nonlinearity.

In some embodiments, the base metal layer and/or the structured metal layer is selected from Gold (Au), Silver (Ag), Copper (Cu), or Aluminium (Al), or an alloy thereof.

In some embodiments, the dielectric layer is formed by a semiconducting material, in particular by Silicon (Si), Germanium (Ge), Indium Gallium Arsenide (InGaAs), or a material containing nanoparticles or liquid crystals.

In some embodiments, a plasmonic modulator comprises a plasmonic device according to some aspects of the invention.

In some embodiments, a plasmonic detector comprises a plasmonic device according to some aspects of the invention.

A method of operating a plasmonic device in accordance with various embodiments of the invention comprises: transmitting an optical input signal to the input section; applying an electrical signal between the base metal layer and the waveguide structure; receiving an optical output signal from the output section.

A method of operating a plasmonic device in accordance with various embodiments of the invention comprises: transmitting an optical input signal to the input section; and detecting an electrical signal between the base metal layer and the waveguide structure.

A method of operating a plasmonic device in accordance with various embodiments of the invention comprises: transmitting an optical input signal to the input section; and receiving an optical output signal from the output section.

A method of manufacturing a plasmonic device in accordance with various embodiments of the invention comprises: providing a substrate; arranging a dielectric layer between a base metal layer and a structured metal layer and forming with respect to the substrate a vertical stack of layers, and providing based on the vertical stack of layers in a horizontal direction with respect to the substrate an input section, a plasmonic waveguide, and an output section, and configuring the input section to receive an optical input signal and transmit power to the plasmonic waveguide, and configuring the plasmonic waveguide to receive power from the input section and transmit power to the output section, and configuring the output section to receive power from the plasmonic waveguide and transmit an optical output signal.

Plasmonic devices are sometimes denominated by the term plasmonic circuit.

BRIEF DESCRIPTION OF THE DRAWINGS

In the following, advantageous embodiments of the invention will be described with reference to the enclosed drawings. However, neither the drawings nor the description shall be interpreted as limiting the invention.

FIG. 1, 1A, 1B schematically illustrate a top view and cross section views of a plasmonic device in accordance with various embodiments of the invention;

FIG. 1Aa, 1Ab schematically illustrate cross section views of plasmonic devices in accordance with various embodiments of the invention;

FIG. 2b illustrates exemplary graphs of the transmittance of the plasmonic device illustrated in FIG. 2a;

FIG. 3a, 3b, 3c illustrate schematic cross section views of plasmonic devices in accordance with various embodiments of the invention with a waveguide layer;

The figures are only schematic and not to scale. Same reference signs refer to same or similar features.

MODE(S) FOR CARRYING OUT THE INVENTION

Figure 1A:
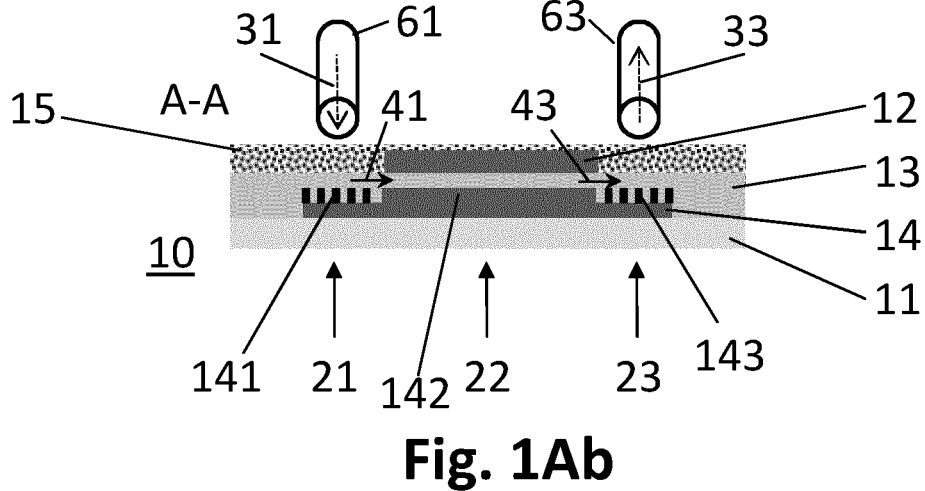

FIG. 1 illustrates a schematic top view of a plasmonic device 10 in accordance with various embodiments of the present invention. FIG. 1A illustrates a schematic cross section view along intersection A-A of the plasmonic device 10 according to FIG. 1. FIG. 1B illustrates a schematic cross section view along intersection B-B of the plasmonic device 10 according to FIG. 1.

As illustrated in FIG. 1A, 1B, the plasmonic device 10 comprises a substrate 11 (not illustrated in FIG. 1) and a dielectric layer 13 arranged between a base metal layer 12 and a structured metal layer 14 which form with respect to the substrate 11 a vertical stack of layers. The base metal layer 12 is deposited on the substrate 11. Furthermore, the dielectric layer 13 is deposited on the base metal layer 12 and the structured metal layer 14 is deposited on the dielectric layer 13. In FIG. 1A, the vertical direction runs orthogonally to the substrate 11 from the bottom to the top of the figure (or vice versa). In FIG. 1B, the vertical direction runs orthogonally to the substrate 11 from the right to the left of the figure (or vice versa). In FIG. 1, the vertical direction runs orthogonally into the plane of the figure (or vice versa).

According to FIG. 1, 1A, 1B, the substrate 11 and the base metal layer 12 cover the same area. In general, however, the substrate 11 covers a larger area than the base metal layer 12 (cf. FIG. 7A, 7B, for example). The dielectric layer 13 covers a smaller area than the substrate 11 or the base metal layer 12. The structured layer 14 covers a smaller area than the dielectric layer 13 or than the base metal layer 12. In accordance with various embodiments, these areas may vary. For example, the dielectric layer 13 may cover the same area as the base metal layer 12, etc. In some embodiments, the dielectric layer 13 does not extend over the area of the base metal layer 12. In other embodiments, the dielectric layer 13 extends over the area of the base metal layer 12, in particular for enabling a simpler fabrication because structuring of the dielectric layer can be avoided. FIG. 1, 1A, 1B schematically illustrate the region of interest close to the plasmonic device 10 and does not illustrate electrical contact pads.

As illustrated in FIG. 1A, 1B (not illustrated in FIG. 1), the plasmonic device 10 comprises a superstrate/cladding 15. However, in accordance with various embodiments of the invention, the superstrate/cladding 15 may be optional.

In accordance with various embodiments, the base metal layer 12 and/or the structured metal layer 14 consist essentially of a metal such as Au (Au: Gold), Ag (Ag: Silver), Cu (Cu: Copper), Al (Al: Aluminum), Ti (Ti: Titanium), or any other metal, having a predefined purity such as 99% or more. Ti may be deposited as an additional layer of for example about 1 nanometer in order to improve adhesion between the dielectric layer 13 and the metal layers 12, 14. Alternatively, a metal layer 12, 14 consists of a metallic alloy, namely a combination of different ratios of metals each having a predefined purity, such as an alloy consisting of Al—Cu in a predefined ratio and purity. In accordance with a preferred embodiment, the base metal layer 12 and the structured metal layer 14 essentially consist of Au having a predefined purity. Alternatively, the base metal layer 12 essentially consists of Cu and the structured metal layer 14 essentially consists of Cu. Alternatively, the base metal layer 12 essentially consists of Ag and the structured metal layer 14 essentially consists of Au.

In accordance with various embodiments, the dielectric layer 13 essentially consists of a dielectric material such as an OEO material (OEO: organic electro-optic) featuring a second-order optical nonlinearity, or a cross-linkable OEO featuring a second-order optical nonlinearity, or an organic electro-optic material featuring a third-order optical nonlinearity, or a sandwich structure of thin dielectric layers, wherein the combination of these layers provides a second-order optical nonlinearity, or a ferroelectric material featuring a second-order optical nonlinearity, or an inorganic dielectric material featuring a third-order optical nonlinearity, or a matrix of dielectric or metallic nanoparticles, wherein the individual nanoparticles or their combination provides a second-order optical nonlinearity.

As illustrated in FIG. 1, 1A, the structured metal layer 14 includes in a horizontal direction with respect to the substrate 11 an input structure 141, a waveguide structure 142, and an output structure 143 which correspondingly enable or provide together with corresponding parts of the dielectric layer 13 and the base metal layer 12 in a horizontal direction with respect to the substrate 11 an input section 21, a plasmonic waveguide 22 and an output section 23. In FIG. 1B, a cross-section of the waveguide structure 142 enabling the waveguide 22 is illustrated, wherein the input structure 141 and the output structure 143 are not illustrated. In FIG. 1, 1A, the horizontal direction runs from left to right (or vice versa). In FIG. 1B, the horizontal direction runs orthogonally into the plane of the figure (or vice versa).

As illustrated in FIG. 1A, the input section 21 is configured to receive an optical input signal 31 and transmit input power 41 to the plasmonic waveguide 22. The plasmonic waveguide 22 is configured to receive input power 41 from the input section 21 and transmit output power to the output section 23. The output section 23 is configured to receive output power 43 from the plasmonic waveguide 22 and transmit an optical output signal 33.

In accordance with various embodiments, as schematically illustrated in FIG. 1A, optical fibers 61, 63, such as multicore optical fibers, may enable transmission of the optical input signal 31 from an optical signal transmitter, such as a laser, to the input section 21 respectively for transmission of the optical output signal 33 to an optical signal receiver, such as a photo diode or an optical coherent receiver enabling detection of phase shifts.

In accordance with various embodiments, as illustrated in FIG. 1, 1A, 1B, the area of the base metal layer 12 covers a larger area than the area of the structured metal layer 14, in particular than the area of the waveguide structure 142. For example, the area of the base metal layer 12 is at least twice as large as the area of the waveguide structure 142 or more, such that the base metal layer 12 has essentially infinite dimensions with respect to the waveguide structure 142. For example, the area of the base metal layer 12 is at least twice as large as the area of the input and/or output structure 141, 143 or more, such that the base metal layer 12 has essentially infinite dimensions with respect to the input and/or output structure 141, 143.

In accordance with various embodiments, as illustrated in FIG. 1, 1A, the input structure 141 and/or the output structure 143 include a grating structure. In a preferred embodiment, a predefined number of straight bars having a predefined geometry are arranged to be separated by predefined distances, wherein the straight bars are arranged orthogonally to the intersection A-A. FIG. 1, 1A illustrates grating structures having five regularly spaced straight bars. In an alternative preferred embodiment, a predefined number of circular or elliptical bars having a focal point on the intersection A-A are arranged to be separated by predefined distances, wherein the grating structure has focusing properties.

In accordance with various embodiments, as illustrated in FIG. 1, 1A, the grating structure of the input structure 141 and/or the output structure 143 enables receiving the optical input signal 31 in an essentially vertical direction and transmitting input power 41 in an essentially horizontal direction to the plasmonic waveguide 22 respectively receiving in an essentially horizontal direction the output power 43 from the plasmonic waveguide 22 and transmitting in an essential vertical direction the output signal 33, in particular in accordance to a predefined efficiency. For example, the efficiency may relate to a coupling efficiency defined by the portion of the power of the optical input signal 31 which is further transmitted as input power 41, respectively the portion of the output power 43 which is further transmitted as power of the optical output signal 33. For example, the coupling efficiency is larger than 20% or larger than 50%.

In accordance with various embodiments, good results are achieved with a grating structure which includes bars having a width between 200 nanometer and 400 nanometer, for example 300 nanometer, wherein the bars are arranged with an edge-to-edge distance of between 200 nanometer and 400 nanometer from each other, and wherein the bars have a length of between 1 micrometer and 5 micrometer, for example 2 micrometer. The bars may be periodically arranged, or the bars may be arranged with variable edge-to-edge distances in order to increase the coupling efficiency. Furthermore, the width of the bars may be constant, or the bars may have a variable width in order to increase the coupling efficiency.

As illustrated in FIG. 1, 1A, seamless integration of the input and output structures 141, 143 is provided.

In accordance with various embodiments, particularly good results are achieved with a grating structure which includes bars having a trapezoid cross section. Good results are achieved for sidewall angles between 5° and 25°, for example 10°. Furthermore, good results are achieved with edges having a rounding radius of about 20 nanometer.

In accordance with various embodiments, expected are particularly good results with a grating structure which includes bars having a step-like cross-section. For example, each grating bar could consist of a portion that has not been etched and a portion that has been partially etched to a thickness between 30 nanometer and 170 nanometer, for example to the thickness of 100 nanometer. The width of the etched and thinned section can range from 10 percent to 90 percent of the total width of the respective metal bar.

In accordance with various embodiments, as illustrated in FIG. 1, the top view of the waveguide structure 142 has a rectangular form, wherein the longer side of the rectangle is arranged in parallel to the intersection A-A. The plasmonic waveguide 22 is provided by the waveguide structure 142 and respective parts of the dielectric layer 13 and respective parts of the base metal layer 12. The plasmonic waveguide 22 is configured such that input power 41 received by the plasmonic waveguide 22 excites surface plasmon polariton modes which are guided by the waveguide 22. In particular, the large distance between the lateral borders of the waveguide structure 142 and the much larger area of the base metal layer 12 enable a reduction or suppression of lateral loss of power by leakage or scattering, making the device 10 more efficient.

In accordance with various embodiments, the length of the waveguide structure 142 is between 8 micrometer and 15 micrometer, for example 11 micrometer, and the width of the waveguide structure 142 is between 500 nanometer and 5 micrometer, for example 1 micrometer. The thickness of the dielectric layer is between 50 nanometer and 200 nanometer, for example 120 nanometer. Thus, the geometry of the plasmonic waveguide in accordance to the present invention differs substantially from plasmonic waveguides in accordance to the prior art. The plasmonic waveguide in accordance to the present invention has, among others, the advantages: of a highly homogeneous optical field in the plasmonic waveguide due to highly parallel field lines; of a highly homogenous electrical field in the plasmonic waveguide in case an electrical signal, e.g. an RF signal (RF: radio frequency), is applied to the metal layers 12, 14; of a strong field overlap between the optical field, the RF electrical field and the dielectric layer 13 resulting in a highly efficient modulation; of a reduction or suppression of scattering and lateral power loss because optical power is confined in the center of the plasmonic waveguide and only a small amount of power is guided at the edge of the plasmonic waveguide, which only small amount of power can be scattered out as a result of so-called edge effects; of a true substrate independence, enabled by basing the device 10 on a base metal layer 12; and of an increased flexibility in forming the dielectric layer 13 by vertically stacking individual dielectric layers, e.g. 1301, 1302, to form an effective dielectric layer. The fabrication method in accordance to the present invention differs substantially from the fabrication method of plasmonic waveguides in accordance to the prior art. The fabrication method has, among others, the advantages: of precisely controllable layer thicknesses, in particular, of a precisely controllable thickness of the dielectric layer 13, which defines the distance between the base metal layer 12 and the structured metal layer 14; of a reduced number of lithography steps, enabled by the integration of the coupling structures 141 and 143 within the structured metal layer 14, and hence no misalignment of the lithography steps; of larger lateral feature sizes of around 300 nanometer; hence of relaxed requirements for the lithography system and process and of relaxed requirements for the fabrication process; hence of higher tolerance to fabrication deviations; and hence of higher process yield.

In accordance with various embodiments, the plasmonic device 10 may be included in a plasmonic modulator, which is configured to modulate the optical output signal 33 in accordance with an electrical voltage applied between the base metal layer 12 and the waveguide structure 142.

In accordance with various embodiments, the plasmonic device 10 may be included in a plasmonic detector, which is configured to receive the optical input signal 31 and to generate a corresponding detectable electrical voltage between the base metal layer 12 and the waveguide structure 142.

In accordance with various embodiments, the plasmonic device 10 may be included in a plasmonic modifier, which is configured to receive an optical input signal 31 which includes one or more input frequencies and to generate an optical output signal 33 which includes one or more output frequencies in accordance with predefined arithmetic operations on the input frequencies, such as a duplication of an input frequency, a difference between input frequencies, etc. The predefined arithmetic operations may be achieved with a dielectric layer 13 having a second order nonlinearity and/or a third order nonlinearity.

FIG. 1Aa illustrates a schematic cross section view of a plasmonic device 10 in accordance with various embodiments of the invention. The plasmonic device 10 illustrated in FIG. 1Aa correspond to the cross section A-A in FIG. 1A. The plasmonic device 10 comprises a substrate 11. The plasmonic device 10 comprises a dielectric layer 13 arranged between a base metal layer 12 and a structured metal layer 14 which from with respect to the substrate 11 a vertical stack of layers. In contrast to the embodiment illustrated in FIG. 1, 1A, 1B, the structured metal layer 14 is deposited on the substrate 11. The structured metal layer 14 includes an input section 141 and an output section 143. The input section 141 and the output section 143 include a grating structure. In a preferred embodiment, arranged are separated by predefined distances a predefined number groves having a predefined geometry, wherein the straight groves are arranged orthogonally to the intersection A-A. FIG. 1Aa illustrates grating structures having five regularly spaced straight groves. In an alternative preferred embodiment, arranged are separated by predefined distances a predefined number of circular or elliptical groves having a focal point on the intersection A-A, wherein the grating structure has focusing properties.

FIG. 1Ab illustrates a schematic cross section view of a plasmonic device in accordance with various embodiments of the invention. The plasmonic device 10 illustrated in FIG. 1Ab corresponds to the plasmonic device in FIG. 1Aa. In contrast to the embodiment illustrated in FIG. 1Aa, the length of the structured metal layer 14 is limited in the direction of the intersection A-A. The limitation of the length of the structured metal layer 14 may be advantageous for the integration of several plasmonic devices in vicinity of each other.

Figure 2A:
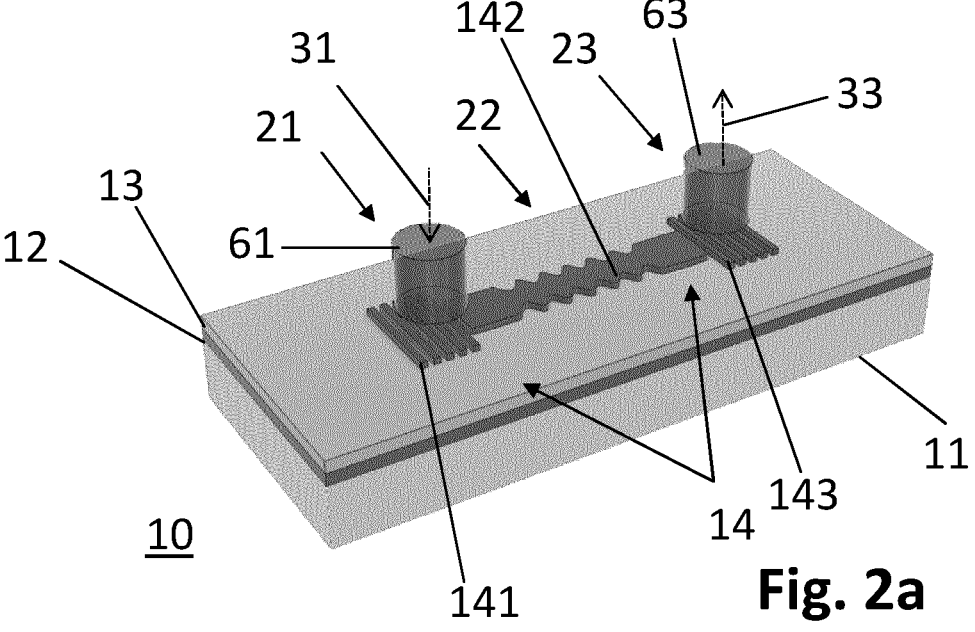
FIG. 2a schematically illustrates a perspective view of a plasmonic device in accordance with various embodiments of the invention.

FIG. 2a illustrates a schematic perspective view of a plasmonic device 10 in accordance with various embodiments of the invention. The plasmonic device 10 comprises a substrate 11. The plasmonic device 10 comprises a dielectric layer 13 arranged between a base metal layer 12 and a structured metal layer 14 which form with respect to the substrate 11 a vertical stack of layers. The base metal layer 12 is deposited on the substrate 11. The dielectric layer 13 is deposited on the base metal layer and the structured metal layer 14 is deposited on the dielectric layer 13. The structured metal layer 14 includes an input structure 141 for enabling an input section 21, a waveguide structure 142 for enabling a plasmonic waveguide 22 and an output structure 143 for enabling an output section 23. The input section 21 is configured to receive an optical input signal 31. The output section 23 is configured to transmit an optical output signal 33. The plasmonic device 10 illustrated in FIG. 2a corresponds essentially to the plasmonic device 10 illustrated in FIG. 1, 1A, 1B. However, in contrast to the embodiment illustrated in FIG. 1, 1A, 1B, each side of the waveguide structure 142 includes laterally arranged notchings. For example, as illustrated in FIG. 2a, the geometry of the notchings may include several periods of a sine function.

Periodic notchings of the waveguide structure 142 have the effect that particular ranges of wavelengths exist where the light is transmitted essentially undisturbed through the device, and that other particular ranges of wavelengths exist where the light is reflected and not transmitted. When applying a voltage to the base metal layer 12 and the waveguide structure 142, the refractive index of the dielectric layer 13 is modified, thereby modifying the ranges of wavelengths where transmission or reflection occurs.

Figures 2B, 3A, 3B, 3C:
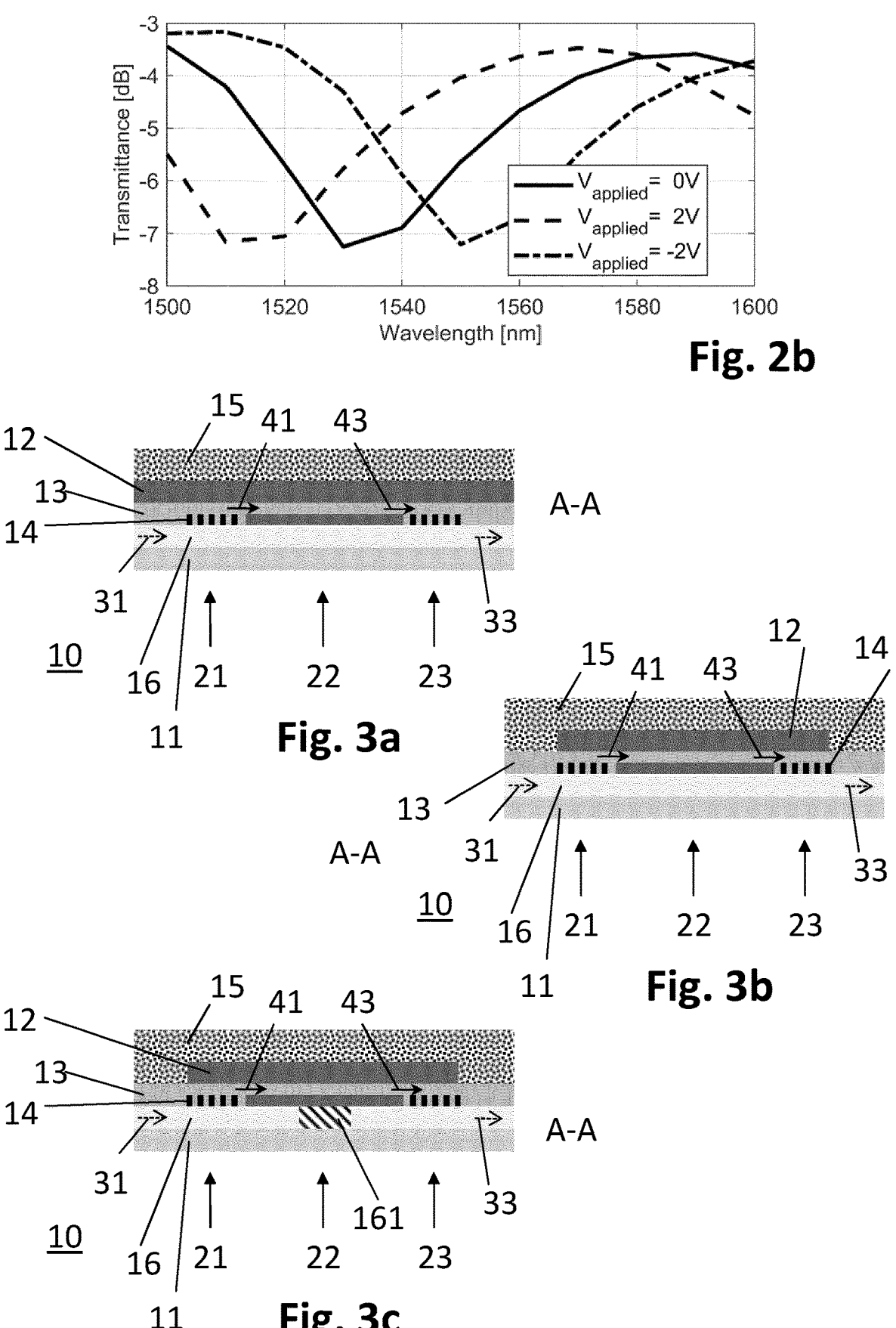

For the plasmonic device 10 illustrated in FIG. 2a, FIG. 2b illustrates exemplary graphs of the transmittance in decibel (dB: decibel) as a function of the wavelength in nanometer for three different refractive indices nOEO of the dielectric layer 13 of an organic electro-optical material (OEO: organic electro-optic). According to the example, when applying a voltage of zero volts (0V) to the metal layers 12, 14, nOEO equals 1.87. When applying a voltage of plus two volts (2V) to the metal layers 12, 14, nOEO equals 1.85. When applying a voltage of minus two volts (−2V) to the metal layers 12, 14, nOEO equals 1.89. For the case of applying zero volts (0V), the transmittance has a minimum at about 1530 nanometer. For the case of applying plus two volts (2V), the transmittance has a minimum at about 1510 nanometer. For the case of applying minus two volts (−2V), the transmittance has a minimum at about 1550 nanometer.

As illustrated in FIG. 2b, for a particular working wavelength of e.g. 1550 nanometer, an amplitude modulation of 3 decibel is achieved for a modulation of the voltage of plus/minus two volts (+−2V).

The embodiment as illustrated in FIG. 2a achieves an optical intensity modulation with only one plasmonic waveguide structure 142, whereas the embodiment as illustrated in FIG. 1, 1A, 1B achieves an optical phase modulation with one plasmonic waveguide structure 142.

FIG. 3a illustrates a schematic cross section view of a plasmonic device 10 in accordance with various embodiments of the invention. The cross section view of FIG. 3a corresponds to the cross section view A-A of FIG. 1A. The plasmonic device 10 comprises a substrate 11. The plasmonic device 10 comprises a dielectric layer 13 arranged between a base metal layer 12 and a structured metal layer 14 which form with respect to the substrate 11 a vertical stack of layers. In contrast to the embodiment illustrated in FIG. 1, 1A, 1B, additionally a waveguide layer 16 is deposited on the substrate 11 and the structured metal layer 14 is deposited on the waveguide layer 16. The waveguide layer 16 is configured for transmission of optical signals. The plasmonic device 10 comprises an input section 21, a plasmonic waveguide 22 and an output section 23. The input section 21 enables receiving an optical input signal 31 which is transmitted via the waveguide layer 16. The output section 23 enables transmitting an optical output signal 33 via the waveguide layer 16. The plasmonic device 10 in accordance with FIG. 3a enables adding plasmonics to existing photonic technologies such as SiN or LiNbO3 technologies.

In accordance with various embodiments, the waveguide layer 16 consists essentially of a material such as silicon nitride (SiN), lithium niobate (LiNbO3), indium phosphide (InP), silicon (Si), silicon oxynitride (SiON), or aluminium nitride (AlN).

In accordance with various embodiments, the thickness of the waveguide layer 16 is between 50 nanometer and 1000 nanometer, for example 300 nanometer.

FIG. 3b illustrates a schematic cross section view of a plasmonic device 10 in accordance with various embodiments of the invention. The plasmonic device 10 illustrated in FIG. 3b corresponds to the plasmonic device 10 illustrated in FIG. 3a. In contrast to the embodiment illustrated in FIG. 3a, the area of the base metal layer 12 is reduced in a horizontal direction, in particular in accordance with the dimension of the structured metal layer 14.

FIG. 3c illustrates a schematic cross section view of a plasmonic device 10 in accordance with various embodiments of the invention. The plasmonic device 10 illustrated in FIG. 3c corresponds to the plasmonic device 10 illustrated in FIG. 3b. In contrast to the embodiment illustrated in FIG. 3b, a separation structure 161 is arranged, which provides a separation of the waveguide layer 16 between the input section 21 and the output section 23. In various embodiments, the separation structure 161 may include any material, such as a metal providing an electrical contact with the structured metal layer, silicon dioxide, etc. and has a length in the horizontal direction as illustrated in FIG. 3c of between 500 nanometer and 2 micrometer, for example of 1 micrometer, or the length of the plasmonic waveguide 22 as discussed above. The separation structure 161 may enable advantageously, for example, the routing of electrical signals in plane and perpendicularly to intersection A-A. Furthermore, the separation structure 161 may enable absorption of optical power travelling in the waveguide layer 16 in order to avoid interference effects with optical output signal 33.

Figure 4A:
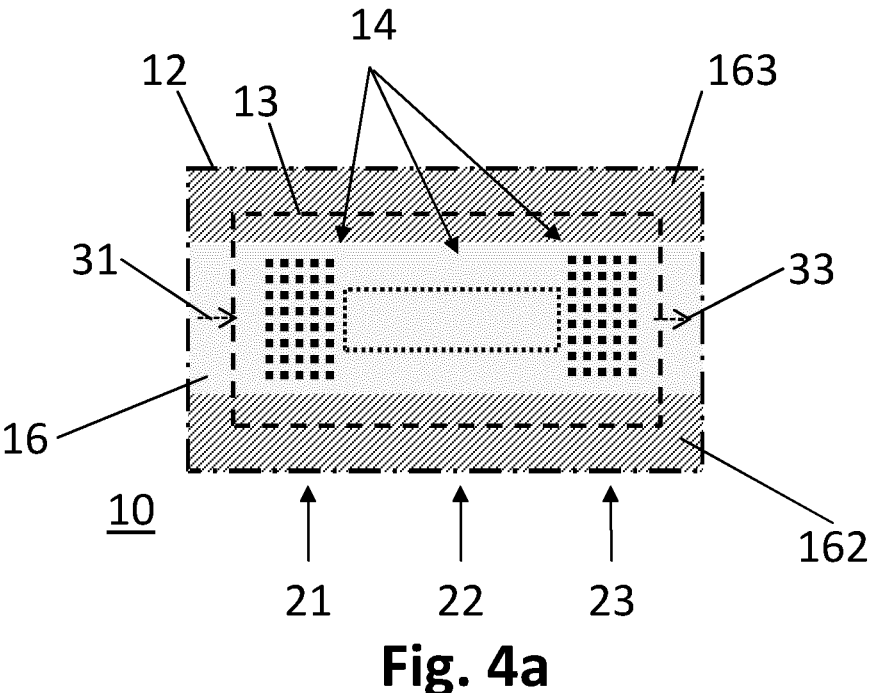
FIG. 4a, 4b illustrate schematically top views of plasmonic devices in accordance with various embodiments of the invention with a waveguide layer.

FIG. 4a illustrates schematically a top view of a plasmonic device 10 in accordance with various embodiments of the invention. The plasmonic device 10 illustrated in FIG. 4a corresponds to the plasmonic device 10 illustrated in FIG. 3a. FIG. 4a illustrates the waveguide layer 16, wherein the base metal layer 12, the dielectric layer 13 and the structured metal layer 14 are schematically illustrated with broken lines. Lateral structures 162, 163 are arranged laterally to the waveguide layer 16 for laterally guiding optical signals, in particular the optical input signal 31 and the optical output signal 33. The lateral structures 162, 163 have the same thickness as the waveguide layer 16 and consist of any different material, such as air, the material used for the superstrate/cladding 15, etc.

Figure 4B:
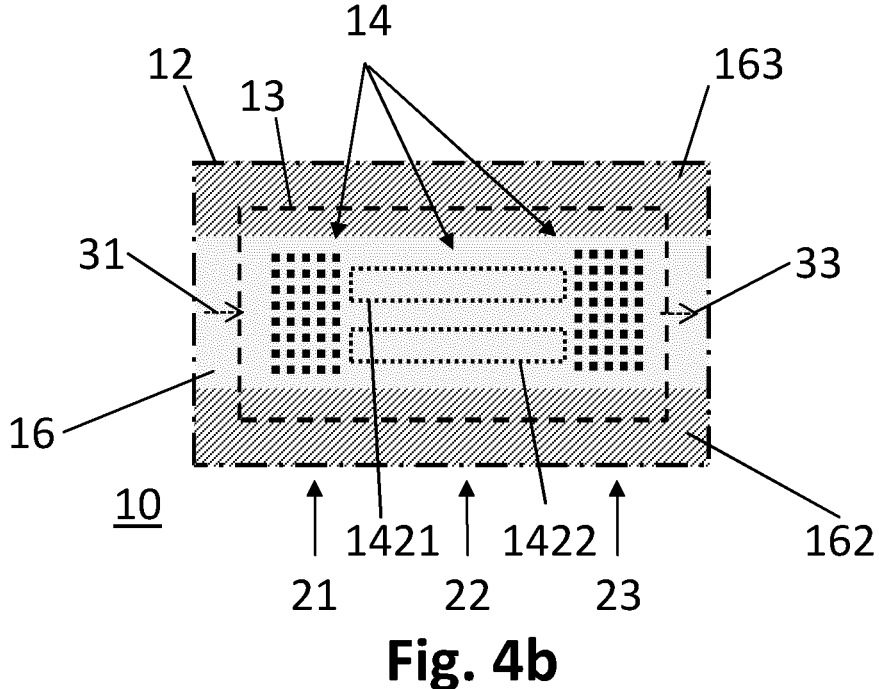

FIG. 4b illustrates a schematic cross section view of a plasmonic device 10 in accordance with various embodiments of the invention. The plasmonic device 10 illustrated in FIG. 4b corresponds to the plasmonic device 10 illustrated in FIG. 4a. In contrast to the embodiment illustrated in FIG. 4a, the waveguide structure 142 includes a first waveguide structure 1421 and a second waveguide structure 1422 which are laterally separated from each other and which provide individual plasmonic waveguides 221, 222. Input power 41 resulting from the optical input signal 31 is divided with a ratio of 50:50 into the individual plasmonic waveguides 221, 222, and output power 43 transmitted by the individual plasmonic waveguides 221, 222 is combined for transmission of the optical output signal 33. For example, the plasmonic device 10 enables implementing a Mach-Zehnder interferometer, which will be discussed below in connection with a similar plasmonic device 10 corresponding to the plasmonic device 10 illustrated in FIG. 1, 1A, 1B.

Alternatively (not illustrated in FIG. 4b), in order to provide individual plasmonic waveguides, the optical input signal 31 may be divided with a ratio of 50:50 into individual optical input signals, in particular within the waveguide layer 16, which each are transmitted to the input sections of individual plasmonic devices as illustrated in FIG. 3a, 3b, 3c, 4a, 4b. Splitting the optical signal to individual plasmonic devices is more complicated or impossible with the plasmonic device 10 as illustrated in FIG. 1, 1A, 1B. Device implementations as illustrated in FIG. 3a, 3b, 3c, 4a, 4b can be more easily combined with light manipulation devices, such as optical power splitters, implemented in the waveguiding layer 16.

Figure 5A:
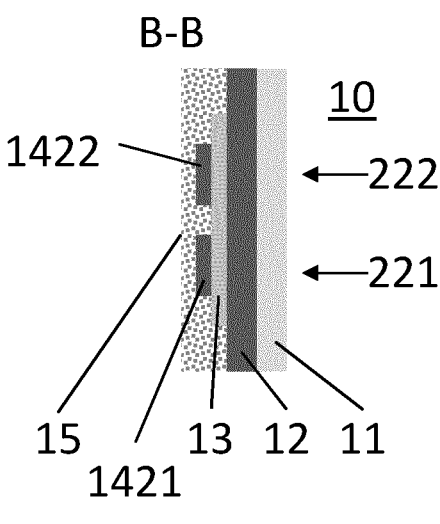
FIG. 5a, 5b illustrate schematically cross section views of plasmonic devices in accordance with various embodiments of the invention with multiple plasmonic waveguides.

FIG. 5a illustrates a schematic cross section view of a plasmonic device 10 in accordance with various embodiments of the invention. The plasmonic device 10 illustrated in FIG. 5a corresponds to the plasmonic device 10 illustrated in FIG. 1, 1A, 1B, and the cross section view B-B corresponds to FIG. 1B. In contrast to the embodiment illustrated in FIG. 1, 1A, 1B, the waveguide structure 142 includes a first waveguide structure 1421 and a second waveguide structure 1422. The first waveguide structure 1421 and the second waveguide structure 1422 have a rectangular form when seen from the top (not illustrated in FIG. 5a), having a width of for example 500 nanometer to 4 micrometer, for example 1 micrometer, and being separated from each other by a distance of for example 100 nanometer to 1000 nanometer, for example by a distance of 500 nanometer.

Figure 5B:
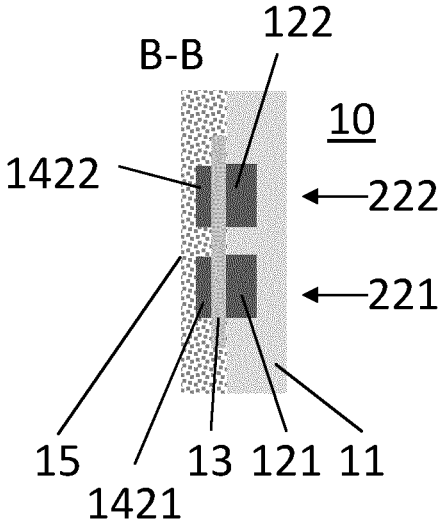

FIG. 5b illustrates a schematic cross section view of a plasmonic device 10 in accordance with various embodiments of the invention. The plasmonic device 10 illustrated in FIG. 5b corresponds to the plasmonic device 10 illustrated in FIG. 5a. In contrast to the embodiment illustrated in FIG. 5a, the base metal layer 12 includes a first structure 121 and a second structure 122. For example, the forms of the first and second structure 121, 122 are adapted to the form of the first and the second waveguide structure 1421, 1422, for example so that the first and second structure 121, 122 are not electrically connected to each other. This can be advantageous as two independent electrical signals can be applied to the two independent waveguide structures 1421, 1422, increasing for example the flexibility of the plasmonic device 10 or the modulation efficiency. For example, the first and second structure 121, 122 are arranged within the substrate 11. Hence, the first and second structure 121, 122 form together with the substrate 11 a smooth and continuous surface, which is advantageous for the subsequent deposition of the dielectric layer 13 and is beneficial for the efficient waveguiding in sections 221 and 222.

In accordance to the embodiments illustrated in FIG. 5a, 5b, a first waveguide 221 and a second waveguide 222 are provided, thereby enabling, for example, implementing a Mach-Zehnder interferometer.

Figure 6A:
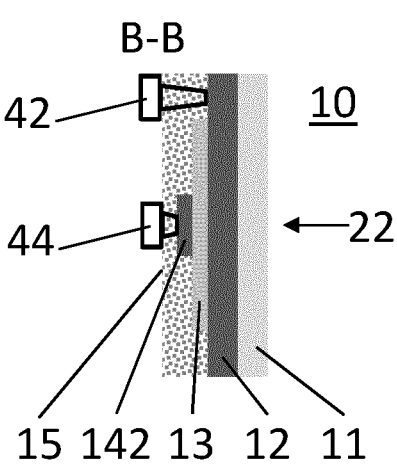
FIG. 6a, 6b illustrate schematically cross section views of plasmonic devices in accordance with various embodiments of the invention with contact pads.
Figure 6B:
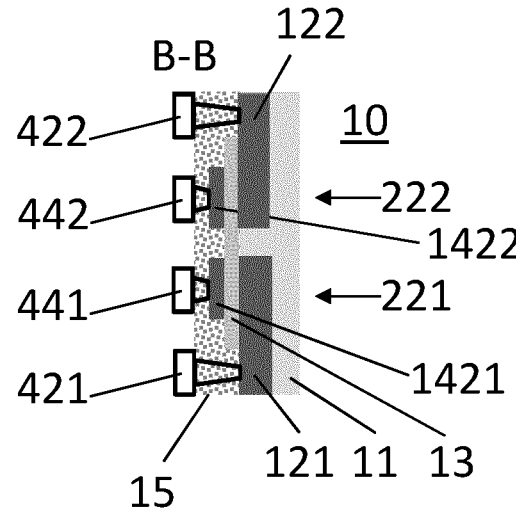

FIG. 6a, 6b illustrate a schematic cross section view of a plasmonic device 10 in accordance with various embodiments of the invention. FIG. 6a, 6b illustrate contact pads 42, 44, 421, 422, 441, 442 for electrically contacting the base metal layer 12 or respective structures 121, 122 and the waveguide structure(s) 142, 1421, 1422. The plasmonic device 10 illustrated in FIG. 6a corresponds to the embodiment illustrated in FIG. 1, 1A, 1B and has a single plasmonic waveguide 22. FIG. 6b corresponds to FIG. 5b and the plasmonic device 10 has a first and a second plasmonic waveguide 221, 222. The contact pads 42, 44, 421, 422, 441, 442 are arranged on the superstrate/cladding 15 and electrically connected through the superstrate/cladding 15 to the base metal layer 12, 121, 122 respectively to the structured metal layer 14, 141, 142.

Figures 7A, 7B:
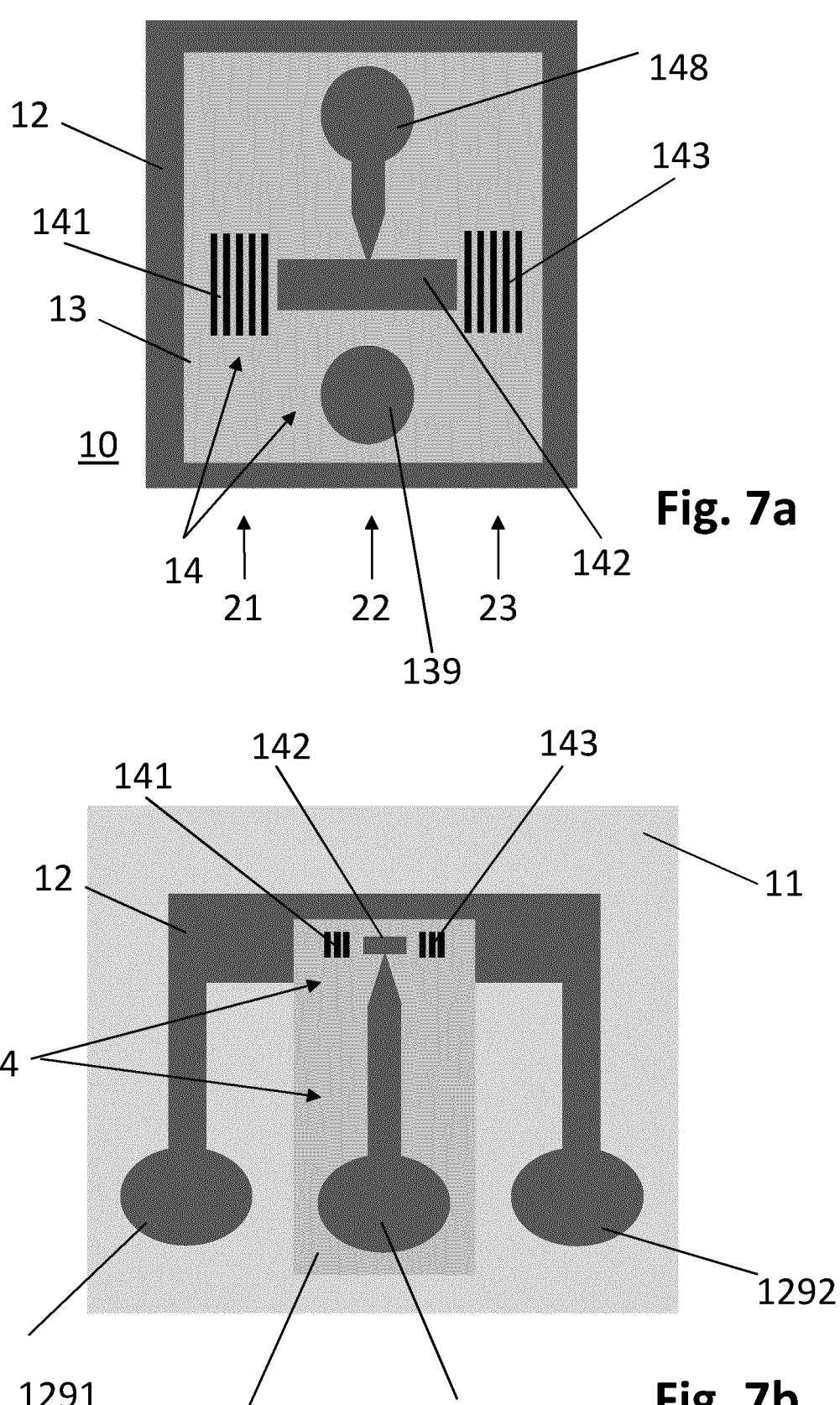
FIG. 7a, 7b illustrate schematically top views of plasmonic devices in accordance with various embodiments of the invention with contact structures.

FIG. 7a illustrates a schematic top view of a plasmonic device 10 in accordance with various embodiments of the invention. The plasmonic device 10 illustrated in FIG. 7a corresponds to the plasmonic device 10 illustrated in FIG. 1, 1A, 1B. In contrast to the embodiment illustrated in FIG. 1, 1A, 1B, the structured metal layer 14 includes a pad structure 148 for electrically contacting the waveguide structure 142. Furthermore, the dielectric layer 13 includes an opening 139 through which the metal layer 12 can be contacted. Pad structure 148 and opening 139 may enable connection to contact pads, for example through the superstrate/cladding 15. Pad structure 148 may form itself a contact pad.

FIG. 7b illustrates a schematic top view of a plasmonic device 10 in accordance with various embodiments of the invention. Deposited on the substrate 11 is a base metal layer 12 having pad structures 1291, 1292. Deposited on the base metal layer 12 and on the substrate 11, if applicable, is a dielectric layer 13. Deposited on the dielectric layer 13 is a structured metal layer 14 with an input structure 141, a waveguide structure 142 and an output structure 143, and furthermore with a pad structure 148. Pad structures 1291, 1292, 148 enable electrically contacting the base metal layer 12 and the waveguide structure 142. In particular, the plasmonic device 10 in accordance to FIG. 7b allows for the contacting with electrical probes (needles) and is hence important for product development and prototyping.

Figures 8A, 8B, 9:
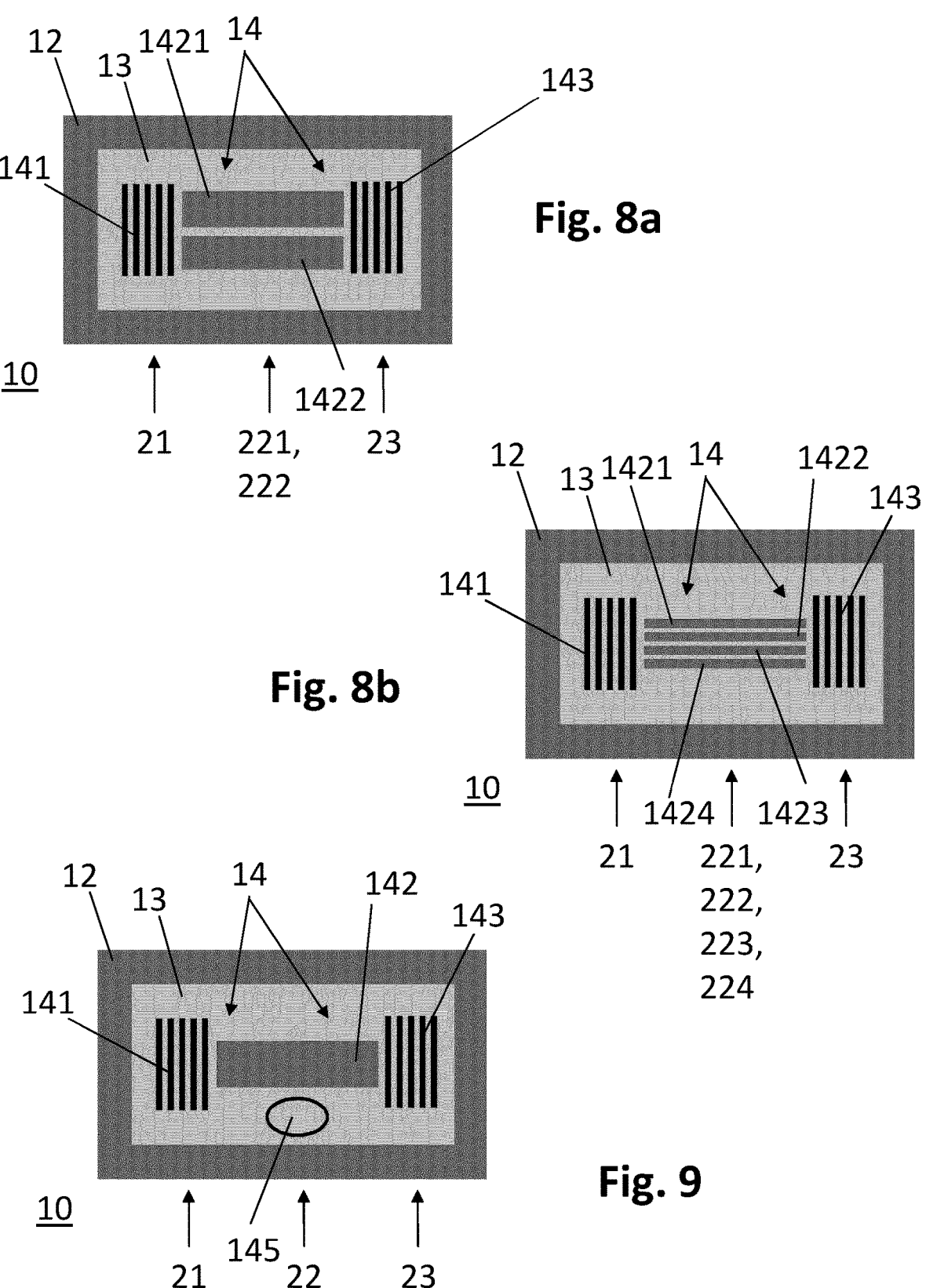
FIG. 8a, 8b illustrate schematically top views of plasmonic devices in accordance with various embodiments of the invention with multiple plasmonic waveguides.
FIG. 9 illustrates schematically a top view of plasmonic devices in accordance with various embodiments of the invention with a resonant element.

FIG. 8a, 8b illustrate a schematic top view of a plasmonic device 10 in accordance with various embodiments of the invention. The structured metal layer 14 includes two individual waveguide structures 1421, 1422 (FIG. 8a) respectively four individual waveguide structures 1421, 1422, 1423, 1424 (FIG. 8b). Accordingly, two individual plasmonic waveguides 221, 222 (FIG. 8a) respectively four individual plasmonic waveguides 221, 222, 223, 224 (FIG. 8b) are enabled. Input power 41 transmitted by the input section 21 is transmitted into the individual plasmonic waveguides with a ratio of 50:50 into the two individual plasmonic waveguides 221, 222 (FIG. 8a) respectively with a ratio of 25:25:25:25 into the four individual plasmonic waveguides 221, 222, 223, 224 (FIG. 8b). Output power 43 transmitted to the output section 23 includes output power received from the individual plasmonic waveguides 221, 222, 223, 224 (FIG. 8a, 8b). The combination of the input/output sections 21, 23 with the plasmonic waveguides 221, 222, (223, 224) acts as a plasmonic power splitter, so that the present invention advantageously avoids the need for individual and additional power splitting components, such as Y-splitters. Slight geometrical distortions of the waveguides 221, 222, 223, 224, e.g., a slight change of their width or radius, can introduce a relative phase change between the arms, e.g., a phase change of Pi/2, hence enabling I/Q modulation.

FIG. 9 illustrates a schematic top view of a plasmonic device 10 in accordance with various embodiments of the invention. The structured metal layer 14 includes a resonant element 145, which is arranged in proximity to the waveguide structure 142. For example, the resonant element 145 includes an optical ring resonator for enabling wavelength-dependent reduced transmission or enhanced reflection. In contrast to plasmonic devices in accordance to the prior art, the resonant element 145 can be included in the structured electrode layer 14, and no further processing steps are necessary.

Figures 10A, 10B:
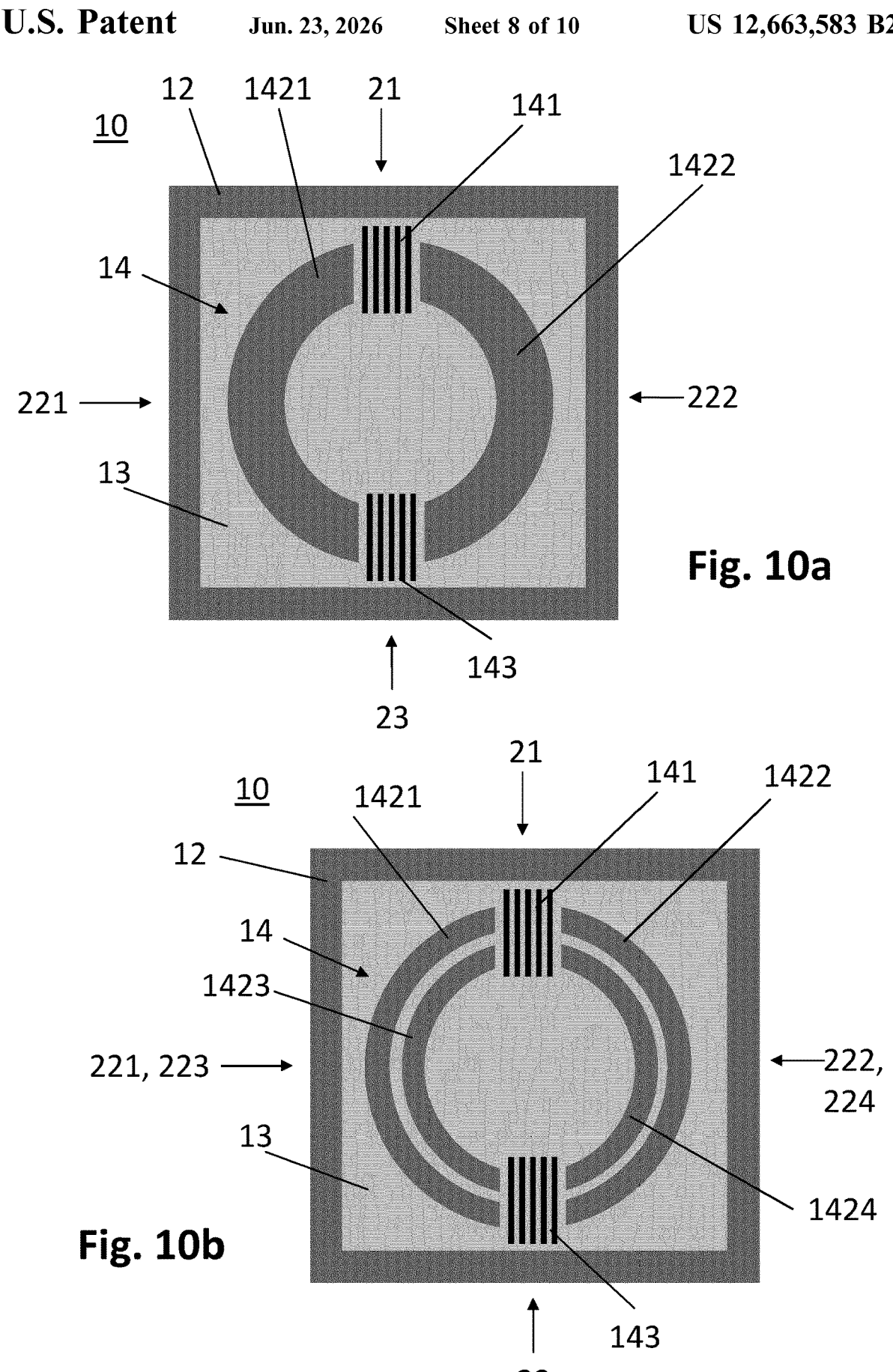
FIG. 10a, 10b illustrate schematically top views of plasmonic devices in accordance with various embodiments of the invention with circular waveguide structures.

FIG. 10a illustrates a schematic top view of a plasmonic device 10 in accordance with various embodiments of the invention. The structured metal layer 14 includes waveguide structures 1421, 1422 having a circular form, wherein a first waveguide structure 1421 having the form of a half circle extends from one side of the input structure 141 to one side of the output structure 143, and a second waveguide structure 1421 having the form of a half circle extends from the other side of the input structure 141 to the other side of the output structure 143. Input power 41 received from the input section 21 is transmitted with a ratio of 50:50 to the waveguide structures 1421, 1422. Output power received from the waveguide structures 1421, 1422 is combined into the output power 43 transmitted to the output section 23.

FIG. 10b illustrates a schematic top view of a plasmonic device 10 in accordance with various embodiments of the invention. The plasmonic device 10 corresponds to the plasmonic device illustrated in FIG. 10a. Contrary to the plasmonic device 10 illustrated in FIG. 10a, concentrically are arranged a first and a third waveguide structure 1421, 1423 having a circular form on one side of the input and output structure 141, 143, and concentrically are arranged a second and fourth waveguide structure 1422, 1424 having a circular form on the other side of the input and output structure 141, 143. Input power 41 received from the input section 21 is transmitted with a ratio of 25:25:25:25 to the waveguide structures 1421, 1422, 1423, 1424. Output power received from the waveguide structures 1421, 1422, 1423, 1424 is combined into the output power 43 transmitted to the output section 23. With respect to plasmonic devices in accordance to the prior art, coupling efficiency is enhanced.

Alternatively, the waveguide structures 1421, 1422, 1423, 1424 illustrated in FIG. 10*a*, 10*b* may have an oval form, or may have a form combined from rectangular, circular and/or oval structures.

Figure 11A:
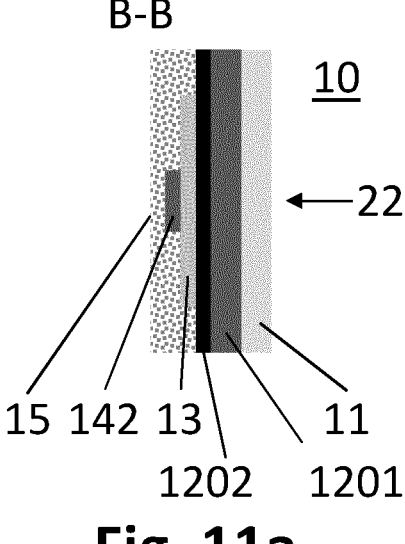
FIG. 11a, 11b illustrate schematically cross section views of plasmonic devices in accordance with various embodiments of the invention with an additional metal layer or an additional insulating layer.

FIG. 11*a* illustrates a schematic cross section view of a plasmonic device 10 in accordance with various embodiments of the invention. Deposited are a first base metal layer 1201 on the substrate 11, a second base metal layer 1202 on the first base metal layer 1201, a dielectric layer 13 on the second base metal layer 1202, a structured layer 14 on the dielectric layer 13, and a superstrate/cladding 15 on the structured layer 14, the dielectric layer 13 and the second metal layer 1202. Accordingly, an additional base metal layer 1202 is provided, thereby enabling the reduction of plasmonic propagation losses or the increase of modulation efficiency for selected choices of metals.

Figure 11B:
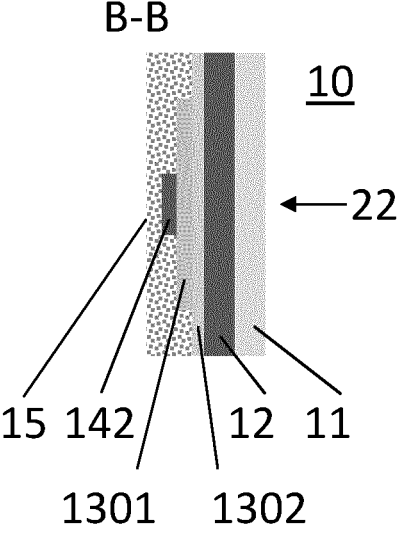

FIG. 11*b* illustrates a schematic cross section view of a plasmonic device 10 in accordance with various embodiments of the invention. Deposited are a base metal layer 12 on the substrate 11, an insulating layer 1302 on the base metal layer 12, a dielectric layer 1301 on the insulating layer 1302, a structured layer 14 on the dielectric layer 1301, and a superstrate/cladding 15 on the structured layer 14, the dielectric layer 1301 and the insulating layer 1302. Accordingly, an additional insulating layer 1302 is provided, thereby enabling advantages such as passivation and protection of the base metal layer 12, higher-efficiency poling of organic electro-optic material 131 by inhibiting charge transport through the layers 1301 and 1302, or providing a surface between layers 1301 and 1302 that is beneficial for the deposition process of layer 1301, as opposed to depositing layer 1301 directly on the base metal layer 12.

Figures 12A, 12B, 12C:
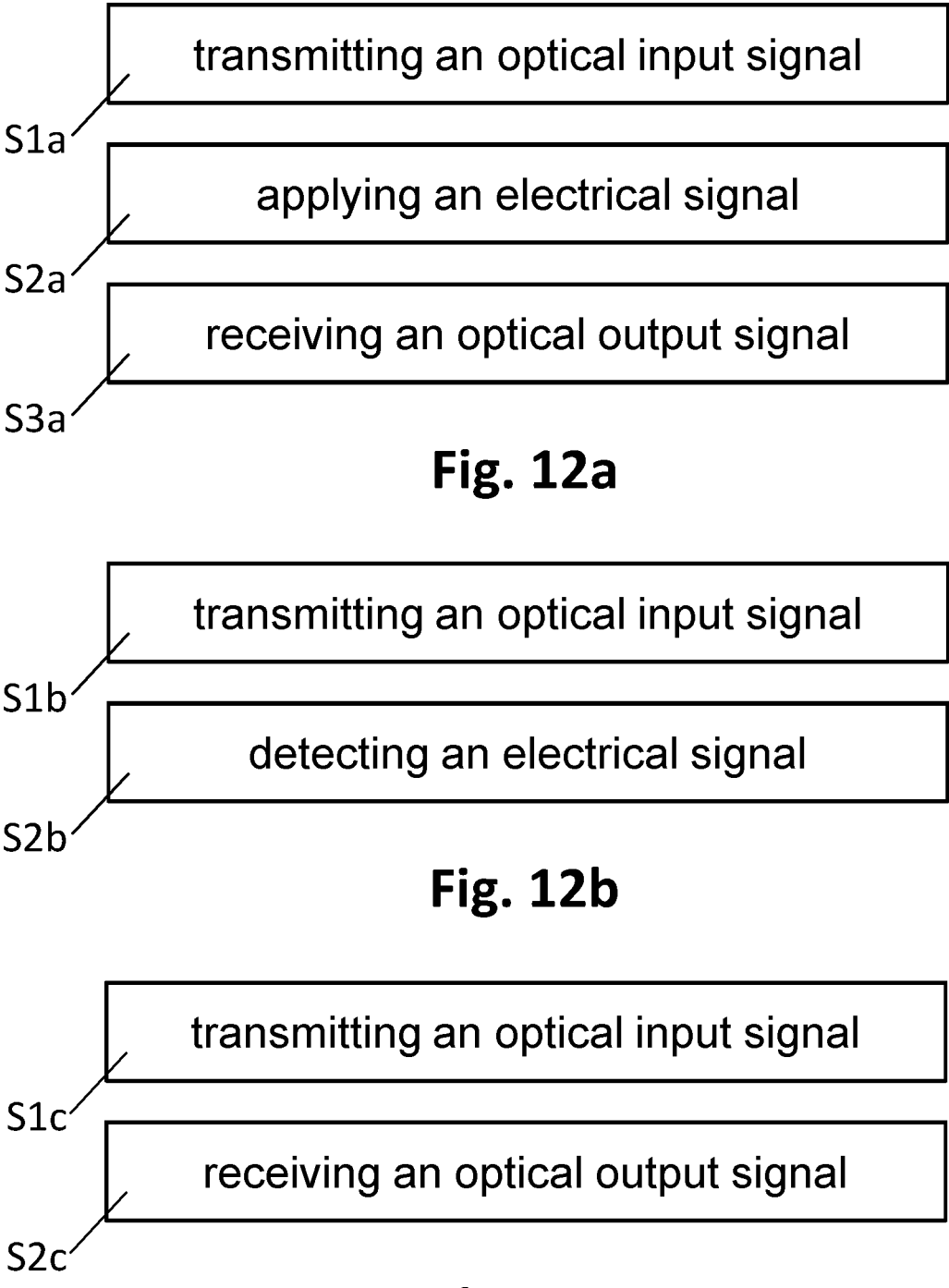
FIG. 12a, 12b, 12c illustrate schematically possible sequences of step of operating a plasmonic device in accordance with various embodiments of the invention.

FIG. 12*a* illustrates a sequence of steps of a method of operating a plasmonic device 10 in accordance with various embodiments of the invention. In step S1*a*, an optical input signal 31 is transmitted to the input section 21. In step S2*a*, an electrical signal is applied between the base metal layer 12 and the waveguide structure 142. In step S3*a*, an optical output signal 33 is received from the output section 23. The optical output signal 33 is modulated in accordance with the electrical signal.

FIG. 12*b* illustrates a sequence of steps of a method of operating a plasmonic device 10 in accordance with various embodiments of the invention. In step S1*b*, an optical input signal is transmitted to the input section 21. In step S2*b*, an electrical signal is detected between the base metal layer 12 and the waveguide structure 142. The electrical output signal is modulated in accordance with the optical input signal 31.

FIG. 12*c* illustrates a sequence of steps of a method of operating a plasmonic device 10 in accordance with various embodiments of the invention. In step S1*c*, an optical input signal is transmitted to the input section 21. In step S2*c*, an optical output signal 33 is received from the output section 23. The output signal 33 includes one or more frequencies in accordance with predefined arithmetic operations on one or more frequencies of the input signal 31, such as a duplication of an input frequency, a difference between input frequencies, etc. The predefined arithmetic operations may be achieved with a dielectric layer 13 having a second order nonlinearity and/or a third order nonlinearity.

Manufacturing a plasmonic device 10 in accordance of the invention includes the steps providing a substrate 11; and arranging a dielectric layer 13 between a base metal layer 12 and a structured metal layer 14 and forming with respect to the substrate 11 a vertical stack of layers, and providing based on the vertical stack of layers in a horizontal direction with respect to the substrate 11 an input section 21, a plasmonic waveguide 22, and an output section 23, and configuring the input section 21 to receive an optical input signal 31 and transmit input power 41 to the plasmonic waveguide 22, and configuring the plasmonic waveguide 22 to receive input power 41 from the input section 21 and transmit output power 43 to the output section 23, and configuring the output section 23 to receive output power 43 from the plasmonic waveguide 22 and transmit an optical output signal 33.

In particular, manufacturing a plasmonic device 10 may include providing a substrate and depositing metal layers 12, 14, a dielectric layer 13, a waveguide layer 16, a superstrate/cladding 15, etc. Depositing a metal layer 12, 14 may include electron-beam evaporation, such with a Evatec501 tool, with a predefined thickness, such as 200 nanometer. Forming a device pattern, such as the gratings, rectangles, circular or oval sections, etc. of the structured metal layer 14 may include electron-beam lithography, such with a Vistec EBPG5200 tool or UV photo lithography, with negative tone resist and dry-etching with Ar ions (Ar: Argon), such as with an Oxford IonFab300 tool. Forming step-like gratings may include applying a two-step dry-etching process with Ar ions. Forming the dielectric layer 13 may include the spin-coating with the nonlinear OEO material 75% HD-BB-OH/25% YLD12411. Fabrication may include a poling step, wherein the OEO material may be poled by applying a voltage between the metal layers 12, 14.

In accordance with various embodiments, the waveguide structure 142 can be divided into two sections along the direction of propagation of the power travelling in the waveguide 22. In an advantageous implementation, the first section of the waveguide structure 142 provides for high-speed electro-optic modulation, while the second section of the waveguide structure 142 provides for controlling the operating point of the device 10, in particular the operating point of a device 10 configured as a Mach-Zehnder modulator or IQ modulator. As the control of the operating point can be much slower than the high-speed electro-optic modulation, the second section of the waveguide structure 142 can be configured to enable operation in the photonic instead of the plasmonic domain respectively mode, or to enable operation with dielectric materials that induce a very strong phase shift, such as liquid crystals.

The invention claimed is:

1. A plasmonic device, comprising:
   a substrate, and
   a dielectric layer arranged between a base metal layer and
     a structured metal layer which form with respect to the
     substrate a vertical stack of layers,
   wherein the structured metal layer includes arranged in a
     horizontal direction an input structure for enabling an
     input section, a waveguide structure for enabling a
     horizontal plasmonic waveguide, and an output structure for enabling an output section,
   wherein the input section is configured to vertically
     receive an optical input signal and transmit in the
     horizontal direction input power to the horizontal plasmonic waveguide, wherein the horizontal plasmonic waveguide is configured to receive input power from the input section and transmit output power to the output section, and wherein the output section is configured to receive output power in the horizontal direction from the horizontal plasmonic waveguide and vertically transmit an optical output signal, and wherein the waveguide structure of the structured metal layer includes a plurality of laterally and electrically separated individual waveguide structures providing the horizontal plasmonic waveguide in the form of a plurality of individual plasmonic waveguides.

2. The device according to claim 1, wherein an area of the base metal layer is at least twice as large as an area of the waveguide structure.

3. The device according to claim 1, wherein the waveguide structure has a rectangular form, a circular form, an oval form, or a combination thereof.

4. The device according to claim 1, wherein the waveguide structure includes periodically arranged notchings.

5. The device according to claim 1, wherein the structured metal layer further includes a resonant element.

6. The device according to claim 5, wherein the resonant element is arranged adjacent to the waveguide structure.

7. The device according to claim 1, wherein the input structure and/or the output structure include a grating structure.

8. The device according to claim 1, wherein the base metal layer is deposited on the substrate.

9. The device according to claim 1, wherein the structured metal layer is deposited on the substrate.

10. The device according to claim 1, further comprising an optical waveguide layer for transmitting optical signals in an essentially horizontal direction, wherein the waveguide layer is optically connected to the structured metal layer.

11. The device according to claim 1, further comprising one or more additional layers deposited on the substrate, the base metal layer, the dielectric layer and/or the structured metal layer.

12. The device according to claim 11, wherein the one or more additional layers relate to metal layers and/or insulating layers.

13. The device according to claim 1, further comprising a superstrate/cladding.

14. The device according to claim 1, further comprising electrical pads for connecting an electrical signal generator and/or an electrical signal detector to the base metal layer and the waveguide structure.

15. The device according to claim 1, wherein the base metal layer and/or the structured metal layer is selected from Gold, Silver, Copper, Aluminum, or an alloy thereof.

16. A plasmonic modulator comprising a plasmonic device according to claim 1.

17. A plasmonic detector comprising a plasmonic device according to claim 1.

18. The device according to claim 1, wherein the dielectric layer is selected from a material which provides one or more of a second-order nonlinearity and a third-order nonlinearity.

19. A plasmonic device, comprising:

a substrate, and a dielectric layer arranged between a base metal layer and a structured metal layer which form with respect to the substrate a vertical stack of layers, wherein the structured metal layer includes arranged in a horizontal direction an input structure for enabling an input section, a waveguide structure for enabling a horizontal plasmonic waveguide, and an output structure for enabling an output section, wherein the input section is configured to receive an optical input signal and transmit input power to the horizontal plasmonic waveguide, wherein the horizontal plasmonic waveguide is configured to receive input power from the input section and transmit output power to the output section, and wherein the output section is configured to receive output power from the horizontal plasmonic waveguide and transmit an optical output signal, wherein the waveguide structure of the structured metal layer includes notchings which are arranged in the horizontal direction so as to not affect a thickness of the dielectric layer, and wherein the notchings are periodically arranged to control wavelength ranges where transmission or reflection occurs.

20. The device according to claim 19, wherein the notchings are V-shaped.

* * * * *